H. P. OSTRUM.
MACHINE FOR NAILING BOXES.

No. 172,579. Patented Jan. 25, 1876.

Witnesses.

Inventor
Henry P. Ostrum
by his Attorney
Geo. Terry.

UNITED STATES PATENT OFFICE.

HENRY P. OSTRUM, OF NEW HAVEN, CONNECTICUT.

IMPROVEMENT IN MACHINES FOR NAILING BOXES.

Specification forming part of Letters Patent No. 172,579, dated January 25, 1876; application filed September 11, 1875.

*To all whom it may concern:*

Be it known that I, HENRY P. OSTRUM, of the city and county of New Haven and State of Connecticut, have invented an Improvement in Machines for Nailing Boxes; and I do hereby declare the following to be a full, clear, and exact description of the invention, such as will enable others skilled in the art to which it appertains to make and use it, reference being had to the accompanying drawing, forming a part of this specification, in which—

Figure 1:
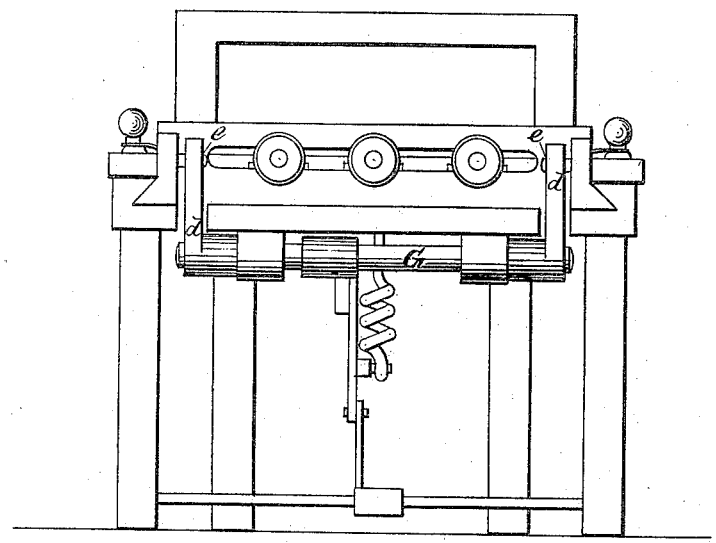
Figure 2:
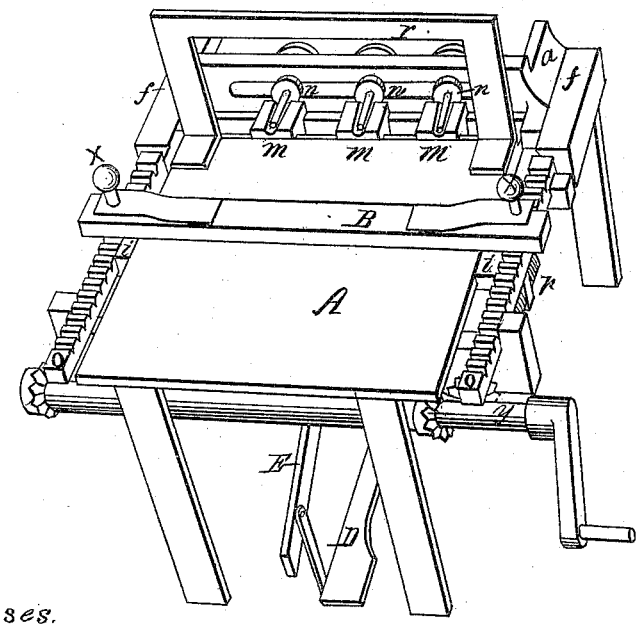

Figure 1 is a direct end view or elevation of the end of the machine. Fig. 2 is a perspective view of the machine.

My invention relates to that class of machines which are used for nailing together the sides and ends of boxes, in which any required number of nails may be simultaneously driven by a treadle or other means; and consists in a novel construction and arrangement of parts, hereinafter more fully set forth and claimed.

The letter A, Fig. 2, indicates a platform of cast-iron, having projections on its under side, in which the rod $y$, screws $p\,p$ and rock-shaft G turn, and on which the ratchets $o\,o$ move back and forth. This platform, with the legs attached, constitutes the frame of the machine. The rest B is a straight bar of metal extending across and beyond the platform A, and has pins $x\,x$ passing through holes in the same, which are forced down upon the ratchets $o\,o$ by springs attached to the rest. It is also provided with the guides $i\,i$, which slide between the side edges of the platform and the ratchets $o\,o$. The ratchets $o\,o$ are straight bars of iron with notches on their upper sides, and are movable back and forth on the projections from the under side of the platform, and extending beyond it. Each of these ratchets has a nut attached to it, in which the screws $p\,p$ turn, and by which the ratchets are moved. Only one of these screws is shown in the drawing. In the front projection from the under side of the platform are two screws or threaded bolts, $p\,p$, Fig. 2, which turn in the projection and in the nuts attached to the ratchets, and have a bevel-gear wheel attached, by which they are turned. The shaft $y$ is also made to turn in the projections from the under side of the platform, and is furnished with two bevel-gear wheels, which mesh in the bevel-gear wheels on the screws $p\,p$, and is also furnished with a crank on one of its ends. The elevated straight bar $r$, supported on two parts attached to the platform, is arranged so that its front side and the front ends of the dies $m\,m\,m$ are in the same plane, and serves to hold one of the pieces to be nailed at right angles to the other piece resting on the platform. The dies $m\,m\,m$ vary in number with the nails to be driven, are made with slots on their upper sides, which are enlarged at their ends nearest the hammers to correspond with the size of the heads of the nails placed in them, and to allow the nails to lie parallel with the platform, or nearly so, and are fitted into the dovetailed slot in the platform. They are loosely held in their places by the hammers, and may be, when desired, securely held by a wedge in the dovetailed slot, moved by a screw on its outer end. The head $a$ is a bar of cast metal, extends across the platform, and has on its ends enlargements or cross-pieces which slide on the platform. It is held in its place by the pieces $f\,f$, screwed to the platform, and has a slot in which the hammers are held, and a pin, $e$, in each of the enlargements or cross-pieces which fit in the slots in the short arms $d\,d$ of the rock-shaft G, by which the head is moved back and forth. The hammers $n\,n\,n$ vary also in number with the nails to be driven, and are in the form of a threaded bolt with a head, from the front ends of which small rods, a little larger than the nails to be driven, project into the enlarged ends of the slots in the dies. They are provided with nuts, by which they are held in the head $a$, and by which they may be adjusted at any distance apart. The rock-shaft G, arranged under the platform, is made to turn in projections from the platform, and with a long arm, E, extending nearly to the front side of the machine; also with two short upright arms, $d\,d$, having slots in their ends. A spiral spring extends from the long arm, and is attached to the under side of the platform and draws the arm upward, while the short arms move the head $a$ backward. The treadle D is a part of, or is attached to, a bar extending to a shaft pivoted to two of the legs of the frame, or is otherwise suitably constructed. It is also suitably connected to the long arm of the rock-shaft $c$.

With the above description of the parts of my machine its operation will be readily understood. As the pieces to be nailed together are placed, the one perpendicularly against the front ends of the dies $m\ m\ m$ and against the elevated bar $a$, and the other on the platform against the first, and as the rest B is adjusted against it by the pins $x\ x$ operating on the ratchets $o\ o$ as pawls, the pieces are then screwed together between the dies $m\ m\ m$ and the rest B by turning the rod $y$ geared to the screws $p\ p$, moving the ratchets $o\ o$ and the rest B. The frame A, the dies $m\ m\ m$, and the rest B, adjusted by the pins $x\ x$ acting on the ratchets $o\ o$, and moved by the screws $p\ p$, cooperate to tightly hold the pieces to be nailed. The pieces being thus held, as the treadle D is forced downward the head $a$, with the hammers $n\ n\ n$, is forced forward, driving the nails placed in the slots in the dies $m\ m\ m$ to their places, nailing the two pieces together.

I am aware of the patent granted to M. Blaser, No. 155,284, September 22, 1874, and hereby disclaim the same.

I claim as my invention—

The combination of frame A, treadle D, rock-shaft G, head $a$, provided with one or more adjustable hammers, $n\ n$, one or more adjustable dies, $m\ m$, and the rest B, all the said parts constructed and combined substantially as set forth.

HENRY P. OSTRUM.

Witnesses:
  GEORGE TERRY,
  ROGER M. SHEMAN.